United States Patent [19]

Bromley

[11] Patent Number: 5,583,890
[45] Date of Patent: Dec. 10, 1996

[54] ERROR CORRECTION OF MSK SIGNALS DEPENDENT ON SAMPLE QUALITY

[75] Inventor: Steven D. Bromley, Austin, Tex.

[73] Assignee: Motorola, Inc., Schaumburg, Ill.

[21] Appl. No.: 308,230

[22] Filed: Sep. 19, 1994

[51] Int. Cl.$^6$ .................................................. H04L 27/10
[52] U.S. Cl. .......................... 375/274; 375/305; 375/336;
329/300; 332/100; 371/44
[58] Field of Search ................................... 375/274, 305,
375/336; 329/300; 371/43, 44, 45; 332/100

[56] References Cited

U.S. PATENT DOCUMENTS

| | | | |
|---|---|---|---|
| 4,359,692 | 11/1982 | Ryan | 329/300 |
| 4,669,095 | 5/1987 | Hall | 375/336 |
| 4,715,048 | 12/1987 | Masamura | 375/347 |
| 5,048,058 | 9/1991 | Kaleh | 375/336 |
| 5,425,058 | 7/1995 | Mui | 375/336 |

Primary Examiner—Stephen Chin
Assistant Examiner—T. Ghebretinsae
Attorney, Agent, or Firm—Nicholas C. Hopman

[57] ABSTRACT

A method and corresponding apparatus for error correction of MSK-coded data receives a signal (101) partitionable into adjacent frames (111,113) each subdividable into three tridents (103, 105, 107). A first sample quality metric (225) applicable to a p (123) of the signal (101) associated with a last trident (107) of the tridents of a first frame (111) of the adjacent frames (111, 113) is synthesized, and a second sample quality metric (227) applicable to a portion (125) of the signal (101) associated with a first trident (103') of the tridents of a second frame (113) following the first frame (111) is synthesized. Each of the first and second sample quality metrics (225, 227) have a magnitude dependent on a time that the associated portion (123) of the signal (101) has a magnitude exceeding an average magnitude (127) of the signal (101). A corrected polarity (113) of the portion of the signal (101) associated with the last trident (107) of the tridents of the first frame (111) is determined dependent on a sample quality metric having a greater magnitude of the first sample quality metric (225) and the second sample quality metric (227).

15 Claims, 5 Drawing Sheets

ERROR CORRECTION OF MSK SIGNALS DEPENDENT ON SAMPLE QUALITY

FIELD OF THE INVENTION

This invention is generally directed to the field of communication systems, and specifically to error management in a minimum-shift-keying type communication system.

BACKGROUND OF THE INVENTION

Contemporary communication systems employ coding of information to be communicated not at least for efficiency reasons. One coding approach is known as minimum-shift-keying coding, or MSK coding. Characteristic of this coding and communication approach is a benefit of requiring a relatively small signal bandwidth compared with other coded communication schemes.

Problematically, MSK based communications systems are particularly susceptible to noise-induced errors during reception and demodulation of MSK-coded signals. Receiver noise figure, threshold noise, and RF interference are all potential sources of data corruption—or error. Since communication systems are often designed with constraints on transmission signal strength, which affects error performance it is vital to detect and if possible correct for erroneous transceptions. Erroneous reception of the actual data communicated is a real and measurable phenomena. BER, or bit error rate, is a commonly accepted measure of the communication error.

Some prior art error management schemes attempt to improve a BER of a MSK system using a technique known as forward error correction or, FEC. The FEC scheme adds redundancy to the transceived data at the cost of communication bandwidth. This loss of communication bandwidth is critical in communication systems because bandwidth is a cardinal metric of the value of communication systems.

What is needed is an improved error management approach for a minimum-shift-keying system that does not require additional communication bandwidth.

DETAILED DESCRIPTION OF A PREFERRED EMBODIMENT

In a preferred embodiment a method and corresponding apparatus for error correction of MSK-coded data receives a signal partitionable into adjacent frames, each subdividable into three parts. A first sample quality metric applicable to a portion of the signal associated with a last part of the parts of a first frame of the adjacent flames, is synthesized, and a second sample quality metric applicable to a portion of the signal associated with a first part of the parts of a second frame following the first frame is synthesized. Each of the first and second sample quality metrics, have a magnitude dependent on a time that the associated portion of the signal has a magnitude exceeding an average magnitude of the signal. A corrected polarity of the portion of the signal associated with the last part of the parts of the first frame is determined dependent on a sample quality metric of the first sample quality metric and the second sample quality metric having a greater magnitude. Said another way, a sample quality metric is synthesized for each of 2 predictable parts of a possibly corrupted MSK-coded signal and used to determine the more likely state of the data encoded in the signal.

Figure 1:
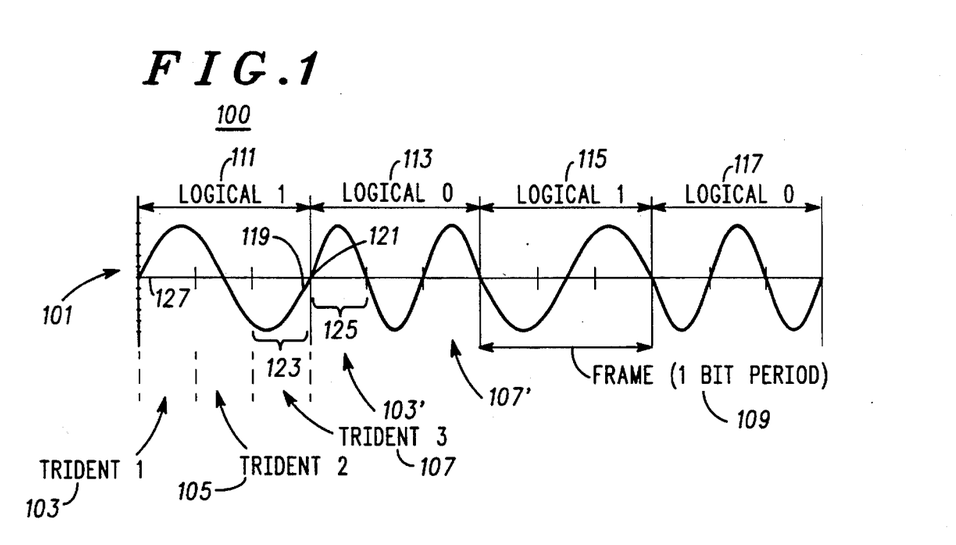
FIG. 1 illustrates a waveform showing an MSK-coded signal.

FIG. 1 illustrates a waveform showing an MSK-coded signal 101. The MSK-coded signal 101 is a continuous phase digitally modulated signal. The MSK-coded signal 101 can be bounded within a sequence of flames, or bit periods. An example frame is shown at reference number 109. Each frame contains a coded signal representing one logical bit of the MSK-coded signal 101.

Within a frame a logical 1 is coded as exactly one cycle of a first frequency. Examples of frames representing a logical 1 state can be seen at reference numbers 111 and 115. Note that both frames associated with reference numbers 111 and 115 contain exactly one cycle of a first frequency. In the preferred embodiment the first frequency is 1,200 Hz.

Also, within a frame, a logical 0 is coded as exactly one and one-half cycles of a second frequency. Examples of frames representing a logical 0 state can be seen at reference numbers 113 and 117. Note that both frames associated with reference numbers 113 and 117 contain exactly one and one-half cycles of a second frequency. In the preferred embodiment the second frequency is 1,800 Hz.

At each frame boundary the MSK-coded signal 101 crosses zero, or an average magnitude shown at reference number 127. Also, at each frame boundary the phase of the signal after the end of a first boundary changes to an opposite phase. This is shown at reference numbers 119 and 121 as the MSK-coded signal 101 crosses between the frames associated with the logical 1 111 and the logical 0 113 transitioning across the average magnitude shown at reference number 127. This phase continuity at frame transitions is characteristic of the generation of MSK-coded signals.

Two signal phases of each of the first and second frequencies are necessary to maximize encoding efficiency of the MSK-coded signal 101. For instance the logical 1 111 illustrates a positive phase of the first frequency, while the logical 1 115 illustrates a negative phase of the first frequency. Also, the logical 0 113 exemplifies a positive phase of the second frequency, while the logical 0 117 exemplifies a negative phase of the second frequency.

A frame, for instance the frame associated with the logical 1 111, can be further divided into several parts. In the preferred embodiment three parts, or tridents, are used. Depending on the coding scheme other quantities of parts can be used dependent on the decoding scheme employed. Here, a first trident 103, a second trident 105, and a third trident 107, represent areas delimiting parts of the MSK-coded signal 101.

Furthermore, based on the continuous phase relationship of generated MSK-coded signals, the signal polarity must be different between the last trident 107 of a given frame and the first trident of the following, adjacent, frame. This property is shown in the relationship between signal segment 123 which is a portion of a frame in the last trident having a negative polarity, and a signal segment 125 which is a portion of a frame in the first trident of the following frame having a positive polarity.

In the case of the first frequency, the phase polarity of the MSK-coded signal 101 in a first trident, trident 1 103, is opposite a phase polarity of the MSK-coded signal 101 in a third trident, trident 3 107. In the case of the second frequency, the phase polarity of the MSK-coded signal 101 in a first trident, trident 1 103', is equal to a phase polarity of the MSK-coded signal 101 in a third trident, trident 3 107'.

Figure 2:
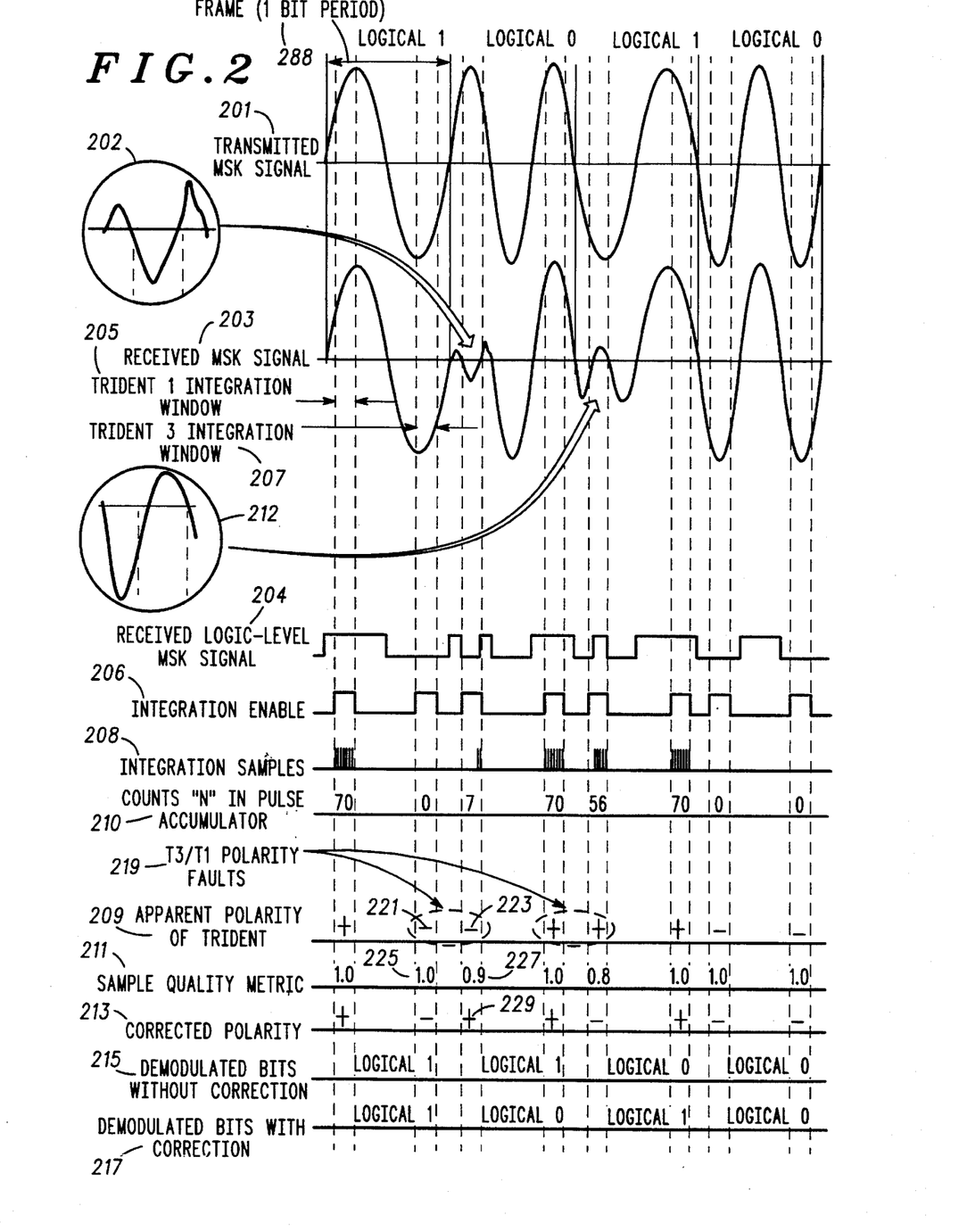
FIG. 2 is a chart showing multiple MSK-coded signal waveforms including decoding information.

FIG. 2 is a chart showing multiple MSK-coded signal waveforms including decoding information. A transmitted MSK-coded signal 201 is included for reference, and shows a waveshape of an original signal. The transmitted sequence shown is: logical 1, logical 0, logical 1, then logical 0. A frame 288 represents one bit period. A received MSK-coded signal 203 exhibits a type of corruption common in communication systems, with glitch 202 and glitch 212 distorting the received MSK-coded signal 203, relative to the original transmitted MSK-coded signal 201. Any distortion in the receive process, whether from noise, circuit non-linearities, or other sources, can cause incorrect demodulation decisions because the received signal may be corrupted during a particular portion of the received waveform chosen for sampling by the demodulator device. In many systems a single sample point is used to evaluate a state of a received signal. Using a single sample point increases the possibility of wrongfully decoding the intended logical state of the signal. A better approach is to integrate the received signal over a period of time, which can average out some of the noise if it is relatively insignificant. Even when integration over a time period is used, a noise glitch which corrupts the received signal for more than one half of an integration period will cause an incorrect demodulation. The present invention improves the capability to receive noisy MSK-coded signals by relying on their inherent continuous phase characteristics and developing and using a sample quality metric in correcting detected phase polarity errors. Prior to discussing the remainder of FIG. 2 it is helpful to describe the apparatus used in the preferred embodiment.

Figure 3:
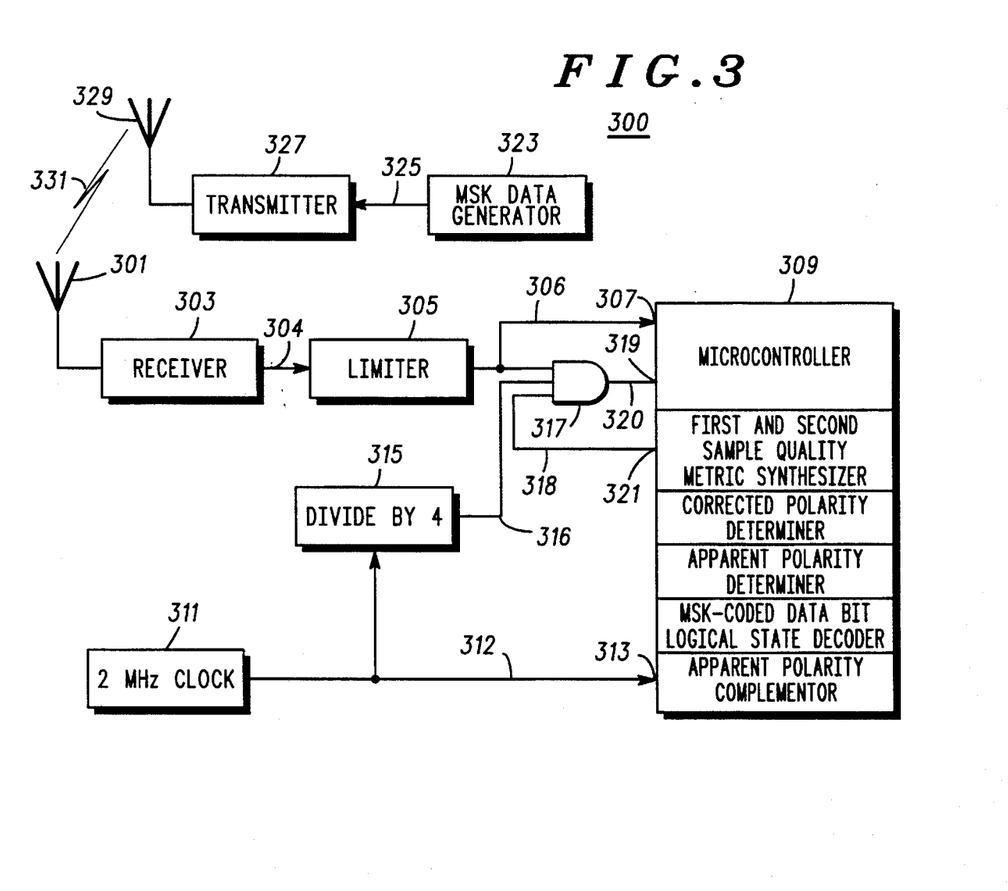
FIG. 3 is a schematic block diagram of an apparatus in accordance with a preferred embodiment of the invention.

FIG. 3 is a schematic block diagram of an apparatus used to execute the method described later. A transmission system includes an MSK data generator 323 that generates an MSK-coded signal 325 and provides it to a transmitter 327. Using a transmitting antenna 329 the transmitter 327 creates a radio signal 331, modulated with the MSK-coded signal 325. A receiving antenna 301 intercepts the radio signal 331 and delivers it to a receiver 303. The receiver 303 converts the received radio signal 331 back into a baseband received MSK-coded signal 304, and routes the received MSK-coded signal 304 to a limiter 305. The limiter 305 further processes the received MSK-coded signal 304 to provide a received logic-level MSK-coded signal 306. This received logic-level MSK-coded signal 306 is characterized by being a logical 1 during positive polarity sections of the received MSK-coded signal 304, and a logical 0 during negative polarity sections of the received MSK-coded signal 304.

The received logic-level MSK-coded signal 306 is applied to a digital timer input 307 of a microcontroller 309, and to one input of a logical AND gate 317. Preferably the microcontroller 309 is a Motorola MC68HC11A8. The Motorola microcontroller 309 includes on-board program memory for encoding operating software described in flow chart forms later. The Motorola microcontroller 309 also includes digital output and input capabilities which are used in this application. A digital clock generator 311 provides a 2 MHZ clock 312 to an oscillator input 313 of the microcontroller 309, thus supplying it with an operating frequency. The 2 MHz clock 312 is further applied to a frequency divider 315. The frequency divider 315 scales the 2 MHz clock 312 to a 500 KHz signal 316 by dividing the clock's frequency by 4. The signal 316 is applied to another input of the logical AND gate 317. Using a digital output port 321, the microcontroller 309 applies a signal named integration enable 318, to a third input of the logical AND gate 317. A signal output, integration samples 320, of the logical AND gate 317 is applied to a pulse accumulator input 319, of the microcomputer 309. The pulse accumulator input 319 provides the signal 320 to a pulse accumulator subsystem of the microcontroller 309. The pulse accumulator acts as a software-resettable 8-bit binary counter.

Figure 4:
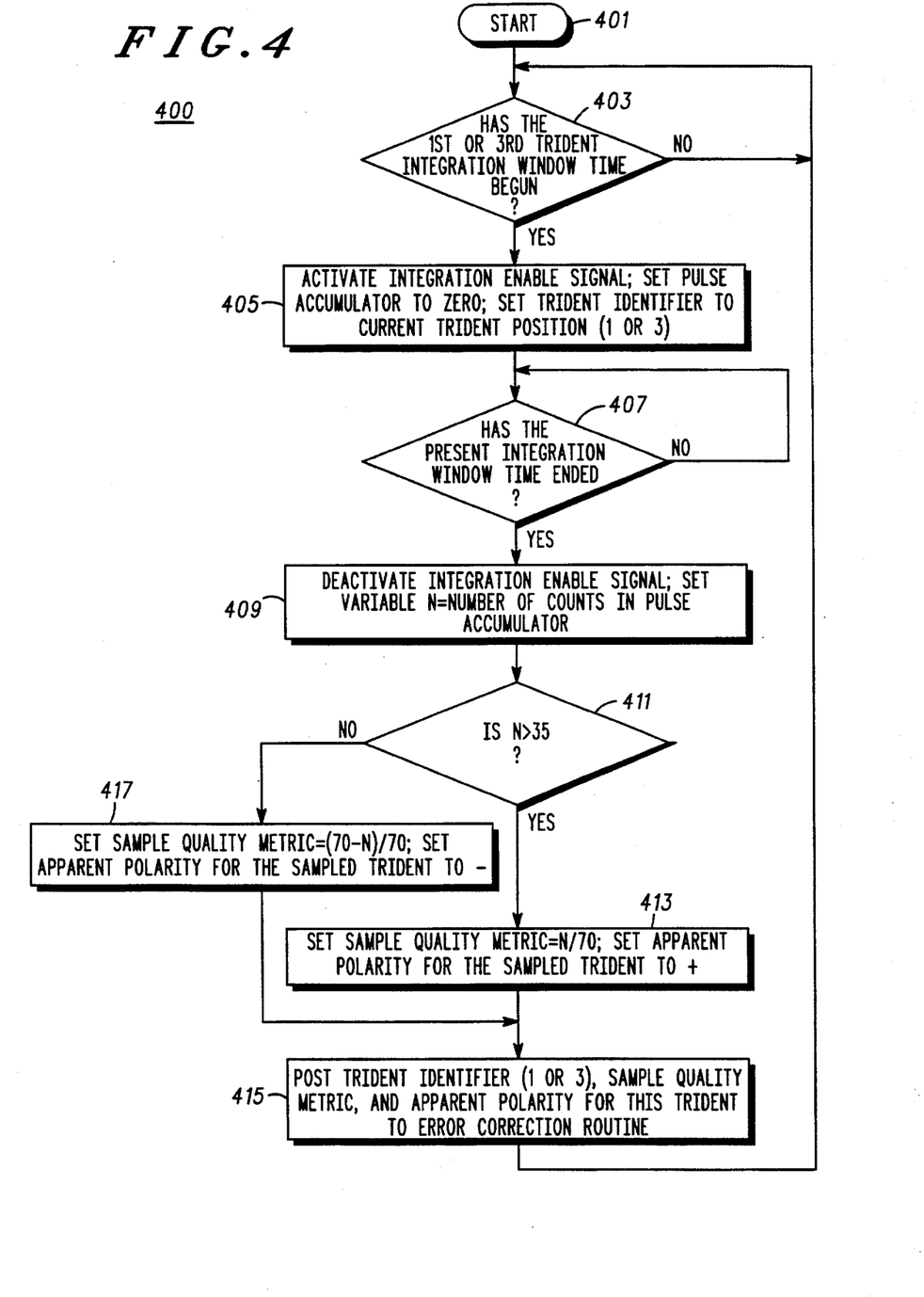
FIG. 4 is a flow chart illustrating a sample quality metric determination method executable on the apparatus shown in FIG. 3.
Figure 5A:
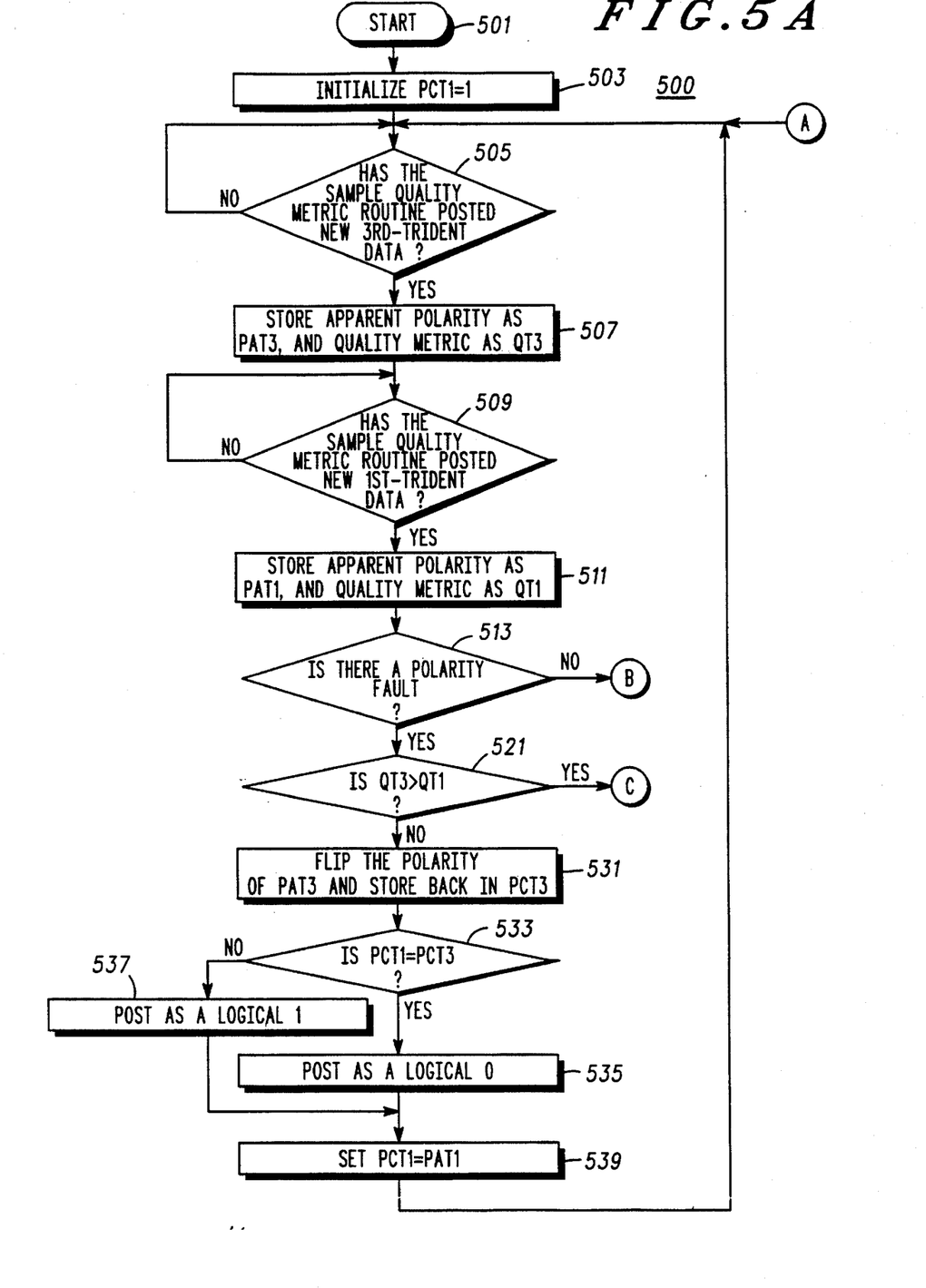
FIG. 5 is a flow chart illustrating various method steps associated with error correction of MSK-coded signals executable on the apparatus shown in FIG. 3, in accordance with the preferred embodiment of the invention.
Figure 5B:
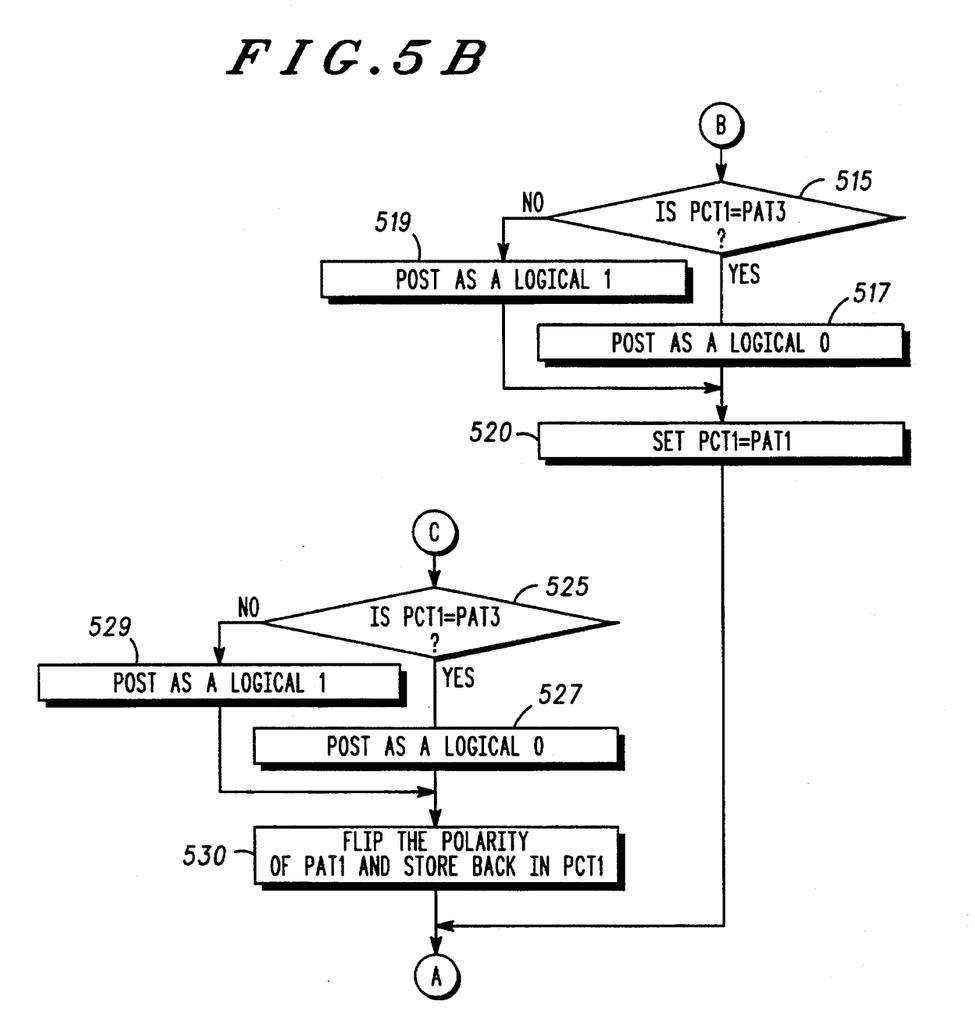

The microcontroller 309 executes instructions associated with method steps described in flow charts shown in FIG. 4 and FIG. 5. These method steps enable the microcontroller 309 to decode an incoming logic-level MSK-coded signal 306 and correct errors using the phase continuous properties of MSK. The microcontroller 309 can perform an effective digital integration of the incoming logic-level MSK-coded signal 306 by first clearing the count of the internal pulse accumulator 319, then activating the integration enable signal 318 for a predetermined window of time, preferably 140 microseconds. When the integration enable signal 318 is high—or a logical 1, and the logic-level MSK-coded signal 306 is low—or a logical 0, the output of the logical AND gate 317 will be correspondingly low. When the integration enable signal 318 is high, and the logic-level MSK-coded signal 306 is high, the output of the logical AND gate 317 will toggle at a 500 KHz rate due to the signal 316 also applied as an input to the logical AND gate 317. Each cycle of 500 KHz passed from the output of the logical AND gate 317 to the pulse accumulator 319, will cause the pulse accumulator 319 to increment its binary counter. This process performs an integration of the logic-level MSK-coded signal 306.

As mentioned, the logic-level MSK-coded signal 306 is also applied to the digital input 307 of the microcontroller 309. This gives the microcontroller 309 access to the logic-level MSK-coded signal 306 timing so that encoded instructions within the microcontroller 309 can synchronize to the received logic-level MSK-coded signal 306 to distinguish the frame demarcations. The synchronization method is well known in the art and therefore is not described in detail here. Details of an appropriate synchronization method can be found in the following U.S. Patent which is incorporated herein by reference U.S. Pat. No. 4,669,095, authored by Hall, issued May 26, 1987.

Referring back to FIG. 2, processing of the indicated received MSK-coded signal 203 with the limiter 305 produces the received logic-level MSK-coded signal 204. Any time the integration enable signal 206 and the logic-level MSK-coded signal 306 are both high, a 500 KHz signal appears as the integration samples signal 208. The integration enable signal 206 is activated in two positions within each frame, a trident 1 integration window 205, in the middle of trident 1 103, and a trident 3 integration window 207, in the middle of trident 3 107. The duration of each integration window 205/207 is preferably 140 microseconds, or one half of a trident duration. When both the integration enable signal 206 and the received logic-level MSK-coded signal 204 are active (high—or a logical 1 state), the 500 KHz signal 316 is passed through the logical AND gate 317. The resulting integration samples signal 208 is fed to the pulse accumulator 319, which counts the number of pulses during each integration window 205/207. Based on the number of counts N 210 in the pulse accumulator 319 at the end of each integration window, the microcontroller assigns a sample quality metric 211 and an apparent polarity 209, as described in FIG. 4. An established method for demodulating MSK-coded signals is to measure the polarity of the signal in the trident 1 103 and the polarity in the trident 3 107 within a frame. If the polarities are the same in both tridents of a given frame then the demodulated bit is a logical 0 (1800 Hz). If the polarities are different in both tridents then the demodulated bit is a logical 1 (1200 Hz). With this known method, using the apparent polarity 209 to demodulate the signal without correction 215, the received sequence is: logical 1, logical 1, logical 0, logical 0. Therefore two of the four bits are incorrectly demodulated.

By further examination of the apparent polarity 209 a polarity fault 219 is noted. In order to represent a correct MSK-coded signal, the polarity must be different between an adjacent trident 3 107 and trident 1 103 because, as mentioned above, the MSK-coded signal is generated with a continuous phase relationship between successive frames. In the example shown in FIG. 2 the apparent polarity 221 and the polarity 223 are both negative. Therefore, something clearly has corrupted the received MSK-coded signal 203, causing at least one of the apparent polarities 221/223 to be incorrect. By using the method detailed in FIG. 5 to correct the polarity faults 219 the incorrect apparent polarity is identified, based on the sample quality metric 211, and corrected as shown in a corrected polarity 213. Specifically the correction method involves first identifying a polarity fault 219 by examining the apparent polarity 221 and the apparent polarity 223, and noting that the two apparent polarities are the same, which is a fault condition. Second, the correction method evaluates the sample quality metric 211, noting that the sample quality metric 225 is associated with the apparent polarity 221, and that the sample quality metric 227 is associated with the apparent polarity 223. Since the sample quality metric 227 is less than the sample quality metric 225, the corrected polarity 229 is flipped relative to the apparent polarity 223. Using the corrected polarity 213 to demodulate the signal provides a sequence of demodulated bits with correction 217: logical 1, logical 0, logical 1, logical 0. The resultant demodulated bit sequence when using the corrected polarity sequence 213 matches the transmitted bit sequence. The errors induced due to the noisy receive process are corrected.

FIG. 4 is a flow chart illustrating a sample quality metric determination method executable on the apparatus shown in FIG. 3. A sample quality metric routine 400 begins with an entry step 401. Execution proceeds with a step 403 where the timing of the incoming signal is checked to see if the 1st or 3rd trident integration window time has begun. If either window has begun then execution proceeds with a step 405. If neither window has begun then the execution of the step 403 repeats.

In the step 405 the integration enable signal 318 is activated, the pulse accumulator counter 319 is cleared to zero, and a trident identifier variable is set to the value of the current trident. Execution proceeds to a step 407, where the timing relative to the incoming MSK-coded signal is evaluated to see if the current integration window is complete. If the current integration window is not complete then step 407 is repeated. If the current integration window is complete then execution moves to a step 409. In step 409 the integration enable signal 318 is deactivated, and the pulse count from the pulse accumulator 319 is placed in a variable N.

Next, in a decision block 411 the value of N is compared to 35, which is in the middle of the range of possible values 0 to 70. If the value of N is greater than 35 it means that the received logic-level MSK-coded signal 306 was high most of the time during the integration window just completed, and execution proceeds with a step 413. If the value N is less than or equal to 35 it means that the received logic-level MSK-coded signal 306 was low most of the time during the integration window just completed, and execution proceeds with a step 417.

In step 413 the sample quality metric for the just-completed trident is set to the value N/70. Also in step 413 the apparent polarity for the sample is set to "+". Execution proceeds from step 413 to a step 415.

In step 417 the sample quality metric for the just-completed trident is set to the value (70–N)/70. Also in step 417 the apparent polarity for the sample is set to "–". Execution proceeds from step 417 to a step 415.

Then, in step 415 the trident identifier from step 405, the calculated sample quality metric, and the calculated apparent polarity are all posted to the error correction routine 500. Execution then returns to step 403.

FIG. 5 is a flow chart illustrating various method steps associated with error correction of MSK-coded signals executable on the apparatus shown in FIG. 3, in accordance with the preferred embodiment of the invention. For reference purposes the following variables are used in the routine 500:

TABLE 1

| Variable Name | Variable Definition |
| --- | --- |
| PAT1 | polarity apparent of trident 1 sample period |
| QT1 | sample quality metric for trident 1 sample period |
| PAT3 | polarity apparent of trident 3 sample period |
| QT3 | sample quality metric for trident 3 sample period |
| PCT1 | polarity corrected of trident 1 sample period |
| PCT3 | polarity corrected of trident 3 sample period |

Execution of the error correction routine 500 begins with an entry step 501 and proceeds to a step 503 in which the variable PCT1 is initialized to 1.

Next, in a decision block 505, the routine 500 checks to see if the sample quality metric routine 400 has posted new third trident data. Note that the routine 400 and the routine 500 run concurrently within the microcontroller 309. If new data is not posted by the sample quality metric routine 400, then execution of the decision block 505 is repeated. If new third-trident data has been posted then execution proceeds to a step 507.

In step 507 the posted apparent polarity is stored in a variable PAT3, and the posted sample quality metric is stored into a variable QT3.

In step 509 the routine 500 looks for the sample quality metric routine 400 to post new first-trident data. If new data is not posted by the sample quality metric routine 400 then execution of decision block 509 is repeated. If new first-trident data has been posted then execution proceeds to a step 511.

In step 511 the posted apparent polarity is stored in a variable PAT1, and the posted sample quality metric is stored into variable QT1.

Next, in a decision block 513, the apparent polarity values PAT3 and PAT1 are checked for a polarity fault. If there is no polarity fault, indicated by the fact that the two apparent polarity values are different, as dictated by the continuous phase properties of MSK-coded signals, then execution flows to step 515 where demodulation of the preceding frame will proceed. If there is a polarity fault, indicated by the fact that the two apparent polarity values PAT3 and PAT1 are the same, then execution proceeds to step 521, where the polarity fault will ultimately be corrected.

Then, in step 515 the previous frame is demodulated using the corrected trident 1 polarity PCT1 from the previous frame, and the apparent polarity of trident 3, which did not need correcting. The demodulation decision is made based on the method previously described, where if the trident 1 and trident 3 polarities within the previous frame are equal, the bit is a logical zero, represented preferably as one and one half cycles of 1800 Hz, and execution proceeds with a step 517. If the trident 1 and trident 3 polarities within the previous frame are different then the bit within the previous frame was a logical 1, represented preferably as one cycle of 1200 Hz, and execution proceeds with a step 519.

In step 517 the demodulated bit value is posted as a logical zero, or 1800 Hz, and execution proceeds with a step 520.

In step 519 the demodulated bit value is posted as a logical one, or 1200 Hz, and execution proceeds with a step 520.

In step 520 the variable PCT1 is set to the value of PAT1 which was the apparent polarity of the first trident just completed. This variable PCT1 will be used as part of the demodulation process for the present frame at a later time. Note that the variable PCT1 represents the "corrected" polarity of trident 1. In the routine 500 execution path leading to step 520 there was no polarity fault detected in PAT1, so the existing value of PAT1 is merely copied verbatim into PCT1. It is by definition "corrected". Execution continues back at step 505.

In step 521 the polarity fault detected in step 513 is evaluated based on the sample metrics QT3 and QT1. If the sample quality metric QT3 is greater than the sample quality metric QT1 then the apparent polarity PAT3 of trident 3 is determined to be correct, the apparent polarity PAT1 of trident 1 is incorrect, and execution proceeds with step 525. Otherwise the apparent polarity PAT1 of trident 1 is determined to be correct, the apparent polarity PAT3 of trident 3 is incorrect, and execution proceeds with step 531.

To get to step 525 the polarity error has occurred in trident 1. Beginning in step 525 the previous frame is first demodulated using the corrected trident 1 polarity PCT1 from the previous frame, and the apparent polarity of trident 3 PAT3, which did not need correcting. The demodulation decision is made based on the method previously described, where if the trident 1 and trident 3 polarities within the previous frame are equal, the bit is a logical zero, represented preferably as one and one half cycles of 1800 Hz, and execution proceeds with a step 527. If the trident 1 and trident 3 polarities within the previous frame are different then the bit within the previous frame was a logical 1, and execution proceeds with a step 529.

In step 527 the demodulated bit value is posted as a logical zero, or 1800 Hz, and execution proceeds with a step 530

In step 529 the demodulate bit value is posted as a logical one, or 1200 Hz, and execution proceeds with the step 530.

In step 530 the polarity of PAT1 is reversed and stored in variable PCT1. This corrected first-trident polarity PCT1 will be used as part of the demodulation process for the present frame at a later time. Execution now proceeds back to decision block 505.

To get to the step 531 the polarity error has occurred in trident 3. In order to demodulate the previous frame, a process that requires a corrected version of the third-trident polarity, the value of PAT3 is reversed and stored into a the variable PCT3 prior to demodulation, which is begins with step 533.

In step 533 the previous frame is demodulated using the corrected trident 1 polarity PCT1 from the previous frame, and the corrected trident 3 polarity PCT3 just determined in step 531. The demodulation decision is made based on the method previously described, where if the corrected trident 1 and trident 3 polarities within the previous frame are equal, the bit is a logical zero, and execution proceeds with a step 535. If the corrected trident 1 and trident 3 polarities within a frame are different then the bit within the previous frame was a logical 1, and execution proceeds with a step 537.

In step 535 the demodulated bit value is posted as a logical zero, or 1800 Hz, and execution proceeds with a step 539.

In step 537 the demodulated bit value is posted as a logical one, or 1200 Hz, and execution proceeds with the step 539.

In step 539 the variable PCT1 is set to the value of PAT1 which was the apparent polarity of the first trident just completed. This variable PCT1 will be used as part of the demodulation for the present frame at a later time. Execution now proceeds back to decision block 505.

In conclusion, the recognition that the transmitted MSK-coded signal has a certain predictable behavior, along with the measurement of a sample quality metric enable the present approach to improve the BER, or bit error rate performance of MSK based communications systems by 1–2 dB (RF) with no burden on communication bandwidth.

What is claimed is:

1. A method for error correction of MSK-coded data comprising the steps of:

receiving a signal partitionable into adjacent frames each subdividable into three parts, wherein a fundamental frequency of the signal is fixed within a frame of the adjacent frames and represents a logical state of an MSK-coded data bit, and wherein the signal has a known phase relationship between the adjacent frames;

synthesizing a first sample quality metric applicable to a portion of the signal associated with a last part of the parts of a first frame of the adjacent frames and a second sample quality metric applicable to a portion of the signal associated with a first part of the parts of a second frame following the first frame, wherein each of the first and second sample quality metrics have a magnitude dependent on a time that the associated portion of the signal has a magnitude different than an average magnitude of the signal; and determining a corrected polarity of the portion of the signal associated with the last part of the parts of the first frame dependent on a sample quality metric having a greater magnitude of the first sample quality metric and the second sample quality metric and providing a corrected MSK-coded data bit dependent thereon.

2. A method in accordance with claim 1 further comprising a steps of:

determining an apparent polarity associated with the first part of the parts of the second frame; and wherein the step of determining a corrected polarity determines the corrected polarity associated with the first part of the parts of the second frame different than the apparent polarity dependent on a sample quality metric having a greater magnitude of the first sample quality metric and the second sample quality metric.

3. A method in accordance with claim 1 further comprising a step of:

decoding a logical state of the MSK-coded data bit dependent on the corrected polarity of each frame.

4. A method in accordance with claim 2 wherein the step of determining a corrected polarity comprises a step of complementing the apparent polarity.

5. A method in accordance with claim 1 wherein a first fundamental frequency represents a first data bit state and a second fundamental frequency represents a second data bit state.

6. A method for error correction of MSK-coded data comprising the steps of:

receiving a signal partitionable into adjacent frames each subdividable into three tridents, wherein a fundamental frequency of the signal is fixed within a frame of the adjacent frames and represents a logical state of an MSK-coded data bit, and wherein the signal has a continuous phase relationship between the adjacent frames;

synthesizing a first sample quality metric applicable to a portion of the signal associated with a last trident of the tridents of a first frame of the adjacent frames and a second sample quality metric applicable to a portion of the signal associated with a first trident of the tridents of a second frame following the first frame, wherein each of the first and second sample quality metrics have a magnitude dependent on a time that the associated portion of the signal has a magnitude different than an average magnitude of the signal;

determining an apparent polarity of the portion of the signal associated with the last trident of the tridents of the first frame, and another apparent polarity of the portion of the signal associated with the first trident of the tridents of the second frame; and determining a corrected polarity of the portion of the signal associated with the last trident of the tridents of the first frame different than the apparent polarity of the signal associated with the last trident of the tridents of the first frame when the apparent polarity and the another apparent polarity are equivalent, the determination dependent on a sample quality metric having a greater magnitude of the first sample quality metric and the second sample quality metric.

7. A method in accordance with claim 6:

wherein the step of determining a corrected polarity determines the corrected polarity of the portion of the signal associated with the first trident of the tridents of the second frame different than the apparent polarity or the signal associated with the first trident of the tridents of the second frame when the apparent polarity and the another apparent polarity are equivalent, the determination dependent on a sample quality metric of the first sample quality metric and the second sample quality metric having a greater magnitude.

8. A method in accordance with claim 7 wherein the step of determining a corrected polarity comprises a step of complementing the apparent polarity.

9. A method in accordance with claim 8 further comprising a step of:

decoding a logical state of the MSK-coded data bit dependent on the corrected polarity of each frame.

10. A method in accordance with claim 8 wherein a first fundamental frequency represents a first data bit state and a second fundamental frequency represents a second data bit state.

11. An apparatus for error correction of MSK-coded data comprising:

a receiver system for receiving a signal partitionable into adjacent frames each subdividable into three parts, wherein a fundamental frequency of the signal is fixed within a frame of the adjacent frames and represents a logical state of an MSK-coded data bit, and wherein the signal has a continuous phase relationship between the adjacent frames;

means for synthesizing a first sample quality metric applicable to a portion of the signal associated with a last part of the parts of a first frame of the adjacent frames and a second sample quality metric applicable to a portion of the signal associated with a first part of the parts of a second frame following the first frame, wherein each of the first and second sample quality metrics have a magnitude dependent on a time that the associated portion of the signal has a magnitude different than an average magnitude of the signal; and means for determining a corrected polarity of the portion of the signal associated with the last part of the parts of the first frame dependent on a sample quality metric having a greater magnitude of the first sample quality metric and the second sample quality metric and providing a corrected MSK-coded data bit dependent thereon.

12. An apparatus in accordance with claim 11 further comprising:

means for determining an apparent polarity associated with the first part of the parts of the second frame; and wherein the means for determining a corrected polarity determines the corrected polarity associated with the first part of the parts of the second frame different than the apparent polarity dependent on a sample quality metric having a greater magnitude of the first sample quality metric and the second sample quality metric.

13. An apparatus in accordance with claim 11 further comprising:

means for decoding a logical state of the MSK-coded data bit dependent on the corrected polarity of each frame.

14. An apparatus in accordance with claim 11 wherein the means for determining a corrected polarity comprises means for complementing the apparent polarity.

15. An apparatus for error correction of MSK-coded data comprising:

a transmission system for transmitting a signal partitionable into adjacent frames each subdividable into three parts, wherein a fundamental frequency of the signal is fixed within a frame of the adjacent frames and represents a logical state of an MSK-coded data bit, and wherein the signal has a continuous phase relationship between the adjacent frames;

a receiver system for receiving the signal and for providing a received signal;

means for synthesizing a first sample quality metric applicable to a portion of the received signal associated with a last part of the parts of a first frame of the adjacent frames and a second sample quality metric applicable to a portion of the received signal associated with a first part of the parts of a second frame following the first frame, wherein each of the first and second sample quality metrics have a magnitude dependent on a time that the associated portion of the received signal has a magnitude different than an average magnitude of the received signal; and means for determining a corrected polarity of the portion of the received signal associated with the last part of the parts of the first frame dependent on a sample quality metric having a greater magnitude of the first sample quality metric and the second sample quality metric and providing a corrected MSK-coded data bit dependent thereon.

* * * * *

UNITED STATES PATENT AND TRADEMARK OFFICE
CERTIFICATE OF CORRECTION

PATENT NO. : 5,583,890
DATED : December 10, 1996
INVENTOR(S) : Steven D. Bromley It is certified that error appears in the above-indentified patent and that said Letters Patent is hereby corrected as shown below:

In Abstract, line 5, "to a p" should be --to a portion--.

Signed and Sealed this

Eighth Day of April, 1997

Attest:

BRUCE LEHMAN

Attesting Officer

Commissioner of Patents and Trademarks